United States Patent
Luo et al.

(10) Patent No.: US 11,859,685 B2
(45) Date of Patent: Jan. 2, 2024

(54) FORMATION METHOD FOR LIQUID RUBBER COMPOSITE NODES WITH DAMPING THROUGH HOLES

(71) Applicant: ZHUZHOU TIMES RUIWEI ANTI-VIBERATION EQUIPMENT LIMITED, Hunan (CN)

(72) Inventors: Jun Luo, Hunan (CN); Haitao Cheng, Hunan (CN); Wensong Liu, Hunan (CN); Sheng Lin, Hunan (CN); Wansheng Feng, Hunan (CN); Junhui Chen, Hunan (CN); Zhongsan Jiang, Hunan (CN); Yuxiang Zhang, Hunan (CN)

(73) Assignee: ZHUZHOU TIMES RUIWEI ANTI-VIBERATION EQUIPMENT LIMITED, Hunan (CN)

( * ) Notice: Subject to any disclaimer, the term of this patent is extended or adjusted under 35 U.S.C. 154(b) by 142 days.

(21) Appl. No.: 17/604,448

(22) PCT Filed: Aug. 18, 2020

(86) PCT No.: PCT/CN2020/109802
§ 371 (c)(1),
(2) Date: Oct. 18, 2021

(87) PCT Pub. No.: WO2021/036865
PCT Pub. Date: Mar. 4, 2021

(65) Prior Publication Data
US 2022/0196108 A1  Jun. 23, 2022

(30) Foreign Application Priority Data
Aug. 30, 2019  (CN) .......................... 201910815526.8

(51) Int. Cl.
*F16F 13/14*   (2006.01)
*B29C 65/00*   (2006.01)
(Continued)

(52) U.S. Cl.
CPC .......... *F16F 13/1445* (2013.01); *B29C 65/02* (2013.01); *B29C 66/71* (2013.01);
(Continued)

(58) Field of Classification Search
CPC .............. F16B 13/1463; F16B 13/1445; F16B 13/1409; F16B 13/14; F16B 13/1454;
(Continued)

(56) References Cited

U.S. PATENT DOCUMENTS

2007/0235912 A1* 10/2007 Sato .................... F16F 13/1445
267/140.13

FOREIGN PATENT DOCUMENTS

| CN | 102644693 | 8/2012 |
| CN | 204845947 | 12/2015 |

(Continued)

OTHER PUBLICATIONS

"International Search Report (Form PCT/ISA/210)" of PCT/CN2020/109802, with English translation thereof, dated Nov. 19, 2020, pp. 1-6.

*Primary Examiner* — John L Goff, II
(74) *Attorney, Agent, or Firm* — JCIP GLOBAL INC.

(57) ABSTRACT

A formation method for liquid rubber composite nodes with middle damping holes is provided. The formation method includes adding a middle spacer sleeve between an outer sleeve and a mandrel, bonding the middle spacer sleeve and the mandrel together through rubber vulcanization, and assembling the integrated middle spacer sleeve and the mandrel into the outer sleeve; forming damping through holes which penetrate through the mandrel on the mandrel;
(Continued)

hollowing the middle spacer sleeve to form a plurality of spaces; after vulcanization, forming a plurality of interdependent liquid cavities by using rubber and the plurality of spaces; and arranging liquid in the plurality of liquid cavities and communicating the plurality of liquid cavities through the damping through holes.

17 Claims, 13 Drawing Sheets

(51) Int. Cl.
  *B29C 65/02* (2006.01)
  *B29L 31/00* (2006.01)
(52) U.S. Cl.
  CPC ....... *B29C 66/742* (2013.01); *B29L 2031/721* (2013.01); *F16F 2226/04* (2013.01)
(58) Field of Classification Search
  CPC .................. F16B 13/28; F16B 2230/06; B29L 2031/721; B29C 65/02; B29C 66/71; B29C 66/742; B61F 5/308; F16F 13/1463; F16F 13/1445; F16F 13/1409; F16F 13/14; F16F 13/1454; F16F 13/28; F16F 2230/06
  USPC .............................................. 267/136–141.7
  See application file for complete search history.

(56) References Cited

FOREIGN PATENT DOCUMENTS

| | | | | |
|---|---|---|---|---|
| CN | 105501242 | | 4/2016 | |
| CN | 107076253 | | 8/2017 | |
| CN | 108343701 | | 7/2018 | |
| CN | 108999884 | | 12/2018 | |
| CN | 109455191 | | 3/2019 | |
| CN | 110388401 A | * | 10/2019 | ............ F16F 15/023 |
| CN | 110454537 | | 11/2019 | |
| CN | 110469623 | | 11/2019 | |
| CN | 110486413 | | 11/2019 | |
| CN | 110500376 | | 11/2019 | |
| DE | 102010033811 A1 | * | 2/2012 | ............ B61F 5/308 |
| JP | S60256637 | | 12/1985 | |
| JP | 4011877 | | 11/2007 | |

* cited by examiner

FORMATION METHOD FOR LIQUID RUBBER COMPOSITE NODES WITH DAMPING THROUGH HOLES

CROSS-REFERENCE TO RELATED APPLICATION

This application is a 371 of international application of PCT application serial no. PCT/CN2020/109802, filed on Aug. 18, 2020 which claims the priority benefit of China application no. 201910815526.8, filed on Aug. 30, 2019. The entirety of each of the above mentioned patent applications is hereby incorporated by reference herein and made a part of this specification.

BACKGROUND

Technical Field

The present invention relates to a formation method for liquid rubber composite nodes, in particular to a formation method for liquid rubber composite nodes with damping through holes.

Description of Related Art

According to the dynamic requirements, a tumbler node provides large radial stiffness to ensure the operational stability and improve the critical speed during linear high-speed operation (high frequency vibration) and provides small stiffness performance to ensure curve passing performance and reduce wear when passing a curve (low frequency and large amplitude). It is difficult for an ordinary node to realize the above characteristics; especially for old lines, wheel rails and lines are worn seriously and need high maintenance cost. Therefore, it is necessary to use a new product having the above characteristics, i.e., a liquid rubber composite node.

Working principle of a liquid rubber composite tumbler node: two hollow cavity structures are mainly designed in a rubber component, two cavities are communicated through a flow channel design and sealed incompressible (viscous) liquid is injected in advance in a cavity. Under the action of load, the volumes in the two cavities are changed and the liquid flows between the two cavities to generate damping to consume vibration energy to achieve the purpose of attenuating vibration. During low frequency vibration, the liquid flows up and down through a channel to achieve a large damping effect; the liquid in a high frequency section cannot flow; a damping value is small and the vibration is effectively isolated; and during high frequency vibration, dynamic stiffness is basically stable and unchanged, thereby achieving the function of preventing dynamic hardening. The frequency ratio of the system is basically unchanged and a good vibration reduction effect still can be achieved.

After retrieval, the relevant domestic patent documents are found as follows:

1. Chinese patent publication of CN102644693A, dated Aug. 22, 2012, discloses a method for regulating the dynamic stiffness of rubber joints with liquid damping. More than two closed cavities are arranged in the rubber joints; the closed cavities are mutually communicated through a throttling passage; and an adjusting device for controlling the flowing area of the throttling passage is arranged on the throttling passage and is used to adjust the size of the throttling passage to adjust the size of the damping force to obtain required dynamic stiffness of the rubber joints.

2. Chinese patent publication of CN105501242A, dated Apr. 20, 2016, discloses a rubber node which comprises: a mandrel, an outer sleeve and a rubber layer. The rubber layer is filled between the mandrel and the outer sleeve; the rubber layer is provided with a first cavity and a second cavity on two symmetrical sides of the mandrel; a first communication passage for connecting the first cavity and the second cavity is arranged in the rubber node; and liquid is filled in the first cavity and the second cavity and the first cavity and the second cavity are not full of the liquid.

3. Chinese patent publication of CN204845947U, dated Dec. 9, 2015, discloses an axle box node which comprises a mandrel, an elastic sleeve and a housing. The middle part of the mandrel is provided with a through hole penetrating the mandrel; the elastic sleeve is sleeved on the outer wall of the spindle; the elastic sleeve is provided with a first cavity and a second cavity; the bottom of the first cavity and the bottom of the second cavity are respectively communicated with both ends of the through hole to form a cavity body; liquid is arranged in the cavity body; and the housing is sleeved outside the elastic sleeve.

4. Chinese patent publication of CN109455191A, dated Mar. 12, 2019, discloses a variable stiffness tumbler node. The tumbler node comprises an outer sleeve, a main spring, an auxiliary spring and a mandrel; the surface of the mandrel is wound with an oil liquid pipeline; the main spring is vulcanized into a whole by two parts of rubber and metal; the metal part of the main spring is pressed together with the mandrel; both ends of the main spring are pressed with auxiliary spring; the auxiliary spring is also vulcanized into a whole by two parts of rubber and metal corresponding to the main spring; the outer sleeve is pressed at the periphery of the main spring and the auxiliary spring; two oil cavities are arranged between the outer sleeve and the main spring by taking the mandrel as a symmetric axis; and the two oil cavities are respectively communicated with two ports of the corresponding oil liquid pipeline.

To further optimize the performance of the liquid rubber composite nodes, the product needs to provide large axial stiffness and realize large dynamic-static ratio so that the existing liquid rubber composite node in the above patent document is difficult to be realized.

In conclusion, it is urgent to design a novel formation method for liquid rubber composite nodes, so as to provide small radial stiffness and large axial stiffness to realize a large dynamic-static ratio, thereby optimizing the product performance of the liquid rubber composite nodes.

SUMMARY

The technical problem to be solved in the present invention is to provide a formation method for liquid rubber composite nodes with middle damping holes with respect to the defects in the prior art, which can provide small radial stiffness and large axial stiffness to realize a large dynamic-static ratio, thereby optimizing the product performance of the liquid rubber composite nodes.

To solve the above technical problems, the present invention adopts the technical solution. A formation method for liquid rubber composite nodes with middle damping holes includes adding a middle spacer sleeve between an outer sleeve and a mandrel, bonding the middle spacer sleeve and the mandrel together through rubber vulcanization and assembling the integrated middle spacer sleeve and the mandrel into the outer sleeve; forming damping through holes which penetrate through the mandrel on the mandrel; hollowing the middle spacer sleeve to form a plurality of spaces; after vulcanization, forming a plurality of interdependent liquid cavities by using rubber and the plurality of spaces; and arranging liquid in the plurality of liquid cavities and communicating the plurality of liquid cavities through the damping through holes.

Preferably, the specific formation method of the liquid cavities is as follows: firstly, a plurality of spaces are dug out on the middle spacer sleeve; the spaces are similar to through holes, and the outer ends and the inner ends of the spaces are open; when the openings at the inner ends of the spaces are sealed, the openings at the inner ends of the spaces are blocked by the vulcanized rubber after the mandrel and the middle spacer sleeve are bonded together through rubber vulcanization; when the openings at the outer ends of the spaces are sealed, an arc cover plate is covered on the hollowed middle spacer sleeve and used for blocking the openings at the outer ends of the spaces; and by using the method, the plurality of spaces form the plurality of liquid cavities.

Preferably, a rubber coating at an outer circumferential surface of the mandrel in the liquid cavities is also provided with a first rubber coating through hole and a second rubber coating through hole. One end of the damping through holes is communicated with one liquid cavity through the first rubber coating through hole, and the other end of the damping through holes is communicated with another liquid cavity through the second rubber coating through hole, thereby communicating the plurality of liquid cavities through the damping through holes.

Preferably, a bump protruding towards the mandrel is arranged on the inner circumferential arc surface of the arc cover plate; the bump comes into contact with the rubber covered on the outer circumferential surface of the mandrel to provide nonlinear stiffness, and the bump comes into indirect contact with the mandrel to form hard stop limiting, or mandrel bumps are arranged on the mandrel, and the rubber is covered on the mandrel and the mandrel bumps; the arc cover plate comes into contact with the rubber located in the liquid cavities and covered on the mandrel and the mandrel bumps to provide nonlinear stiffness, and the arc cover plate comes into indirect contact with the mandrel bumps to form hard stop limiting, or rubber bumps protruding towards the arc cover plate are arranged on the rubber located in the liquid cavities and covered on the outer circumferential surface of the mandrel, and the arc cover plate comes into contact with the rubber bumps to provide nonlinear stiffness.

Preferably, the middle spacer sleeve adopts an integral spacer sleeve or a multi-disc spacer sleeve; two liquid cavities are arranged; and the two liquid cavities are symmetrically distributed on the middle spacer sleeve about the axis of the middle spacer sleeve.

Preferably, when the middle spacer sleeve adopts the multi-disc spacer sleeve, before assembly, a gap E is reserved between the end surfaces of two close ends of adjacent disc bodies; and after assembly, the gap E disappears and the end surfaces of two close ends of adjacent disc bodies come into contact with each other.

Preferably, before assembly, an open gap F is also reserved in the rubber and at each gap E; and after assembly, the open gap F is filled with deformed rubber, so that the open gap F disappears.

Preferably, when the middle spacer sleeve adopts the multi-disc spacer sleeve, non-equal design is adopted, i.e., by taking a center point of the middle spacer sleeve as a circle point, circle center angles corresponding to the plurality of arc disc bodies are unequal; and the circle center angles corresponding to the hollowed arc disc bodies are larger than the circle center angles corresponding to the non-hollowed arc valve bodies.

Preferably, the mandrel is formed by the following method: a mandrel is formed by taking a central axis I of the mandrel as a bus and taking a saddle surface J, which is high at both ends and low in the middle, as a rotating surface.

The rubber between the mandrel and the middle spacer sleeve is divided into two parts; one part of the rubber is middle rubber, and the other part of the rubber is end rubber located at both ends of the middle rubber. The thickness of the middle rubber along the radial direction of the mandrel is set as radial thickness $K1$, and the thickness of the end rubber along the axial direction of the mandrel is set as axial thickness $K2$.

The radial thickness $K1$ and the axial thickness $K2$ are adjusted to adjust the radial stiffness and the axial stiffness of the nodes.

Preferably, when the openings at the outer ends of the spaces are sealed, a step part is arranged on the middle spacer sleeve, a complete ring of the step part is arranged along the openings at the outer ends of the spaces, and the arc cover plate is covered on the step part.

Preferably, the step part is a one-level step; during assembly, the rubber is coated on the step part and the arc cover plate is covered on the step part so that the arc cover plate is in contact with the rubber coating on the step part.

Preferably, the step part is a multi-level step including a one-level outer spacer sleeve step part and a multi-level inner spacer sleeve step part. During assembly, the rubber is coated on the multi-level inner spacer sleeve step part and the arc cover plate is covered on the step part so that the arc cover plate is connected in interference fit with the one-level outer spacer sleeve step part, and the arc cover plate is connected to the multi-level inner spacer sleeve step part in an rubber over-pressure fit mode.

Preferably, the step part is a two-level step and is provided with a first spacer sleeve step part and a second spacer sleeve step part. The first spacer sleeve step part is an outer spacer sleeve step part. The second spacer sleeve step part is an inner spacer sleeve step part; the rubber is coated up to the second spacer sleeve step part. The arc cover plate in contact with the step part is correspondingly arranged into a multi-level step shape. The arc cover plate includes a first cover plate step part and a second cover plate step part. During assembly, when the arc cover plate is covered on the step part, the first cover plate step part is connected in interference fit with the first spacer sleeve step part, and the second cover plate step part is connected to the second spacer sleeve step part in a rubber over-pressure fit mode.

Preferably, a rubber groove is arranged on the first spacer sleeve step part; before assembly, solid gum is applied in the rubber groove; and during assembly, when the first cover plate step part and the first spacer sleeve step part are connected in interference fit, the solid gum is also in contact with the first cover plate step part.

Preferably, a sealing groove is formed on the first spacer sleeve step part. Before assembly, a sealing ring is assembled in the sealing groove; and during assembly, when the first cover plate step part and the first spacer sleeve step part are connected in interference fit, and the sealing ring is also pressed in the sealing groove by the first cover plate step part.

Preferably, a cover plate sealing groove is formed on the second cover plate step part. When the rubber is coated on the second spacer sleeve step part, a sealing bulge is formed on the rubber; and during assembly, when the second cover plate step part is connected with the second spacer sleeve step part in the rubber over-pressure fit mode, the sealing bulge is positioned in the cover plate sealing groove and is extruded and contacted by the cover plate sealing groove.

Preferably, a rubber groove is arranged on the first spacer sleeve step part; before assembly, solid gum is applied in the rubber groove; and during assembly, when the first cover plate step part and the first spacer sleeve step part are connected in interference fit, the solid gum is also in contact with the first cover plate step part.

Preferably, a sealing groove is formed on the first spacer sleeve step part; before assembly, a sealing ring is assembled in the sealing groove; and during assembly, when the first cover plate step part and the first spacer sleeve step part are connected in interference fit, the sealing ring is also pressed in the sealing groove by the first cover plate step part.

The present invention has the beneficial effects that: the present invention forms a plurality of independent liquid cavities capable of storing liquid by hollowing and vulcanizing the rubber on the middle spacer sleeve, then installs the damping through holes which penetrate through the mandrel on the mandrel, and communicates the plurality of liquid cavities by the damping through holes to form liquid rubber composite nodes, so as to provide small radial stiffness and large axial stiffness to realize a large dynamic-static ratio, thereby optimizing the product performance of the liquid rubber composite nodes. Through the design of the specific formation method of the liquid cavities, the liquid cavities can be formed smoothly and the quality of the product is guaranteed. When the middle spacer sleeve is designed into a multi-disc spacer sleeve, the assembly structure and the process thereof are designed so as to ensure that after the interference assembly is completed, direct contact is made between the end surfaces of the two adjacent ends of the adjacent disc bodies without rubber interference, which can further improve the performance of the assembled product. When the middle spacer sleeve is designed into a multi-disc spacer sleeve, the non-equal design is adopted for the middle spacer sleeve, and the volume space of the liquid cavities is enlarged as much as possible. The rubber in the middle of the middle spacer sleeve is divided into the middle rubber and the end rubber, and the radial thickness of the middle rubber and the axial thickness of the end rubber are adjusted to adjust the radial stiffness and the axial stiffness of the nodes. The sealing effect is further improved by the sealing structure design between the arc cover plate and the middle spacer sleeve.

DESCRIPTION OF THE EMBODIMENTS

The technical solution of the present invention is further described in detail below in combination with the drawings and specific embodiments.

Figure 1:
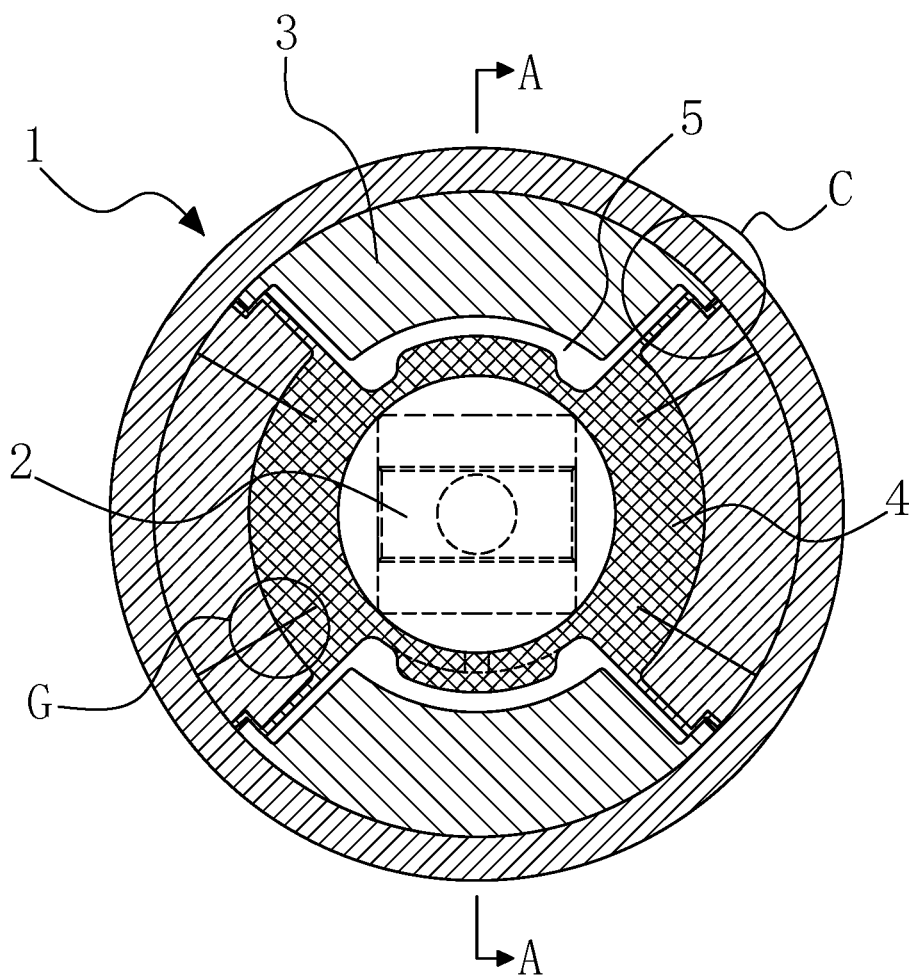
FIG. 1 is a sectional structural schematic diagram of nodes along a radial direction of a mandrel in embodiment 1 of the present invention.
Figure 2:
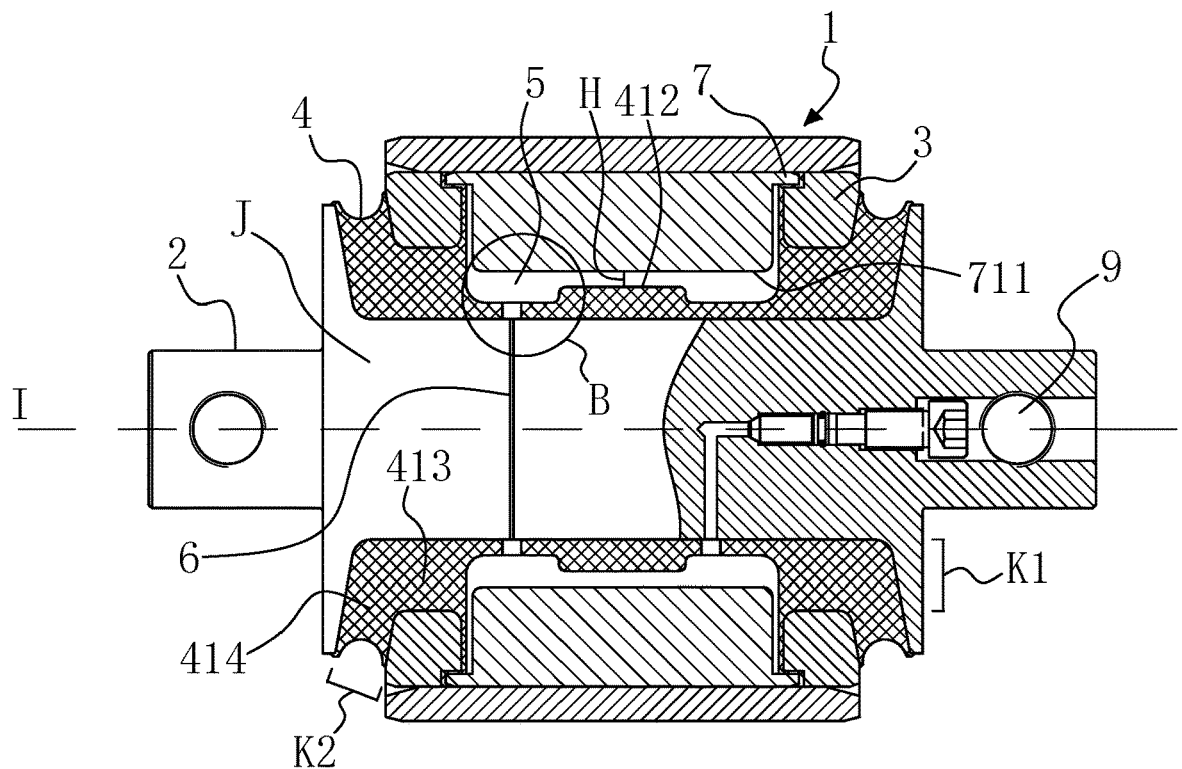
FIG. 2 is a sectional structural schematic diagram along A-A line in FIG. 1.

Embodiment 1: as shown in FIG. 1 and FIG. 2, a formation method for liquid rubber composite nodes with middle damping holes includes the following steps. Adding a middle spacer sleeve 3 between an outer sleeve 1 and a mandrel 2, bonding the middle spacer sleeve 3 and the mandrel 2 together through rubber 4 vulcanization, and assembling the integrated middle spacer sleeve and the mandrel into the outer sleeve 1. Forming damping through holes which penetrate through the mandrel 2 on the mandrel 2. Hollowing the middle spacer sleeve 3 to form a plurality of spaces. After vulcanization, forming a plurality of interdependent liquid cavities 5 by using rubber 4 and the plurality of spaces, and arranging liquid (not shown in the figure) in the plurality of liquid cavities 5 and communicating the plurality of liquid cavities 5 through the damping through holes 6. The liquid rubber composite nodes formed by the above method can provide small radial stiffness and large axial stiffness to realize a large dynamic-static ratio, thereby optimizing the product performance of the liquid rubber composite nodes.

The test data of several samples by the applicant are as follows:

|  | Radial Stiffness | Axial Stiffness | Dynamic-Static Ratio |
|---|---|---|---|
| Sample 1 | 5.68 | 13.16 | 6.5:1 |
| Sample 2 | 5.57 | 12.62 | 7:1 |
| Sample 3 | 5.54 | 12.38 | 6:1 |
| Sample 4 | 5.34 | 13.02 | 6:1 |
| Sample 5 | 5.25 | 11.68 | 5:1 |

As shown in FIG. 1 and FIG. 2, in the present embodiment, two liquid cavities 5 are arranged (the upper liquid cavity at the top and the lower liquid cavity at the bottom in FIG. 1). During work, the two liquid cavities need to be communicated to ensure that liquid can flow back and forth between the two liquid cavities. In the present embodiment, a perforated damping through hole 6 is arranged along the radial direction of the mandrel 2 on the mandrel 2, and the upper liquid cavity and the lower liquid cavity are communicated through the damping through hole 6.

As shown in FIG. 1 to FIG. 4, the formation method for the liquid cavities is as follows: firstly, two spaces (spaces X1 and X2 in FIG. 4) are dug out on the middle spacer sleeve 3. The space X1 and the space X2 are similar to through holes, and the outer ends and the inner ends of the spaces are open. Here, one end of the space adjacent to one side of the mandrel 2 is regarded as the inner end and one end of the space away from one side of the mandrel 2 is regarded as the outer end. In order to ensure that the liquid cavities can store the liquid, openings on both ends of each space need to be sealed so that each space is independently formed. In the present embodiment, when the openings at the inner ends of the spaces are sealed, the openings are sealed by the rubber 4, i.e., the openings at the inner ends of the spaces are blocked by the vulcanized rubber 4 after the mandrel 2 and the middle spacer sleeve 3 are bonded together through rubber 4 vulcanization. When the openings at the outer ends of the spaces are sealed, an arc cover plate 7 is covered on the hollowed middle spacer sleeve 3 and used for blocking the openings at the outer ends of the spaces so that each space forms an independent liquid cavity.

Figure 5:
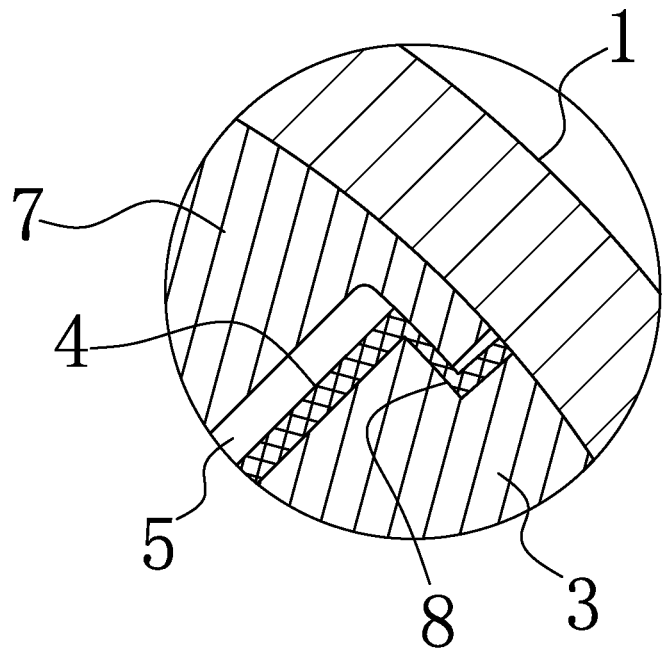
FIG. 5 is an amplified structural schematic diagram of C part in FIG. 1.

As shown in FIG. 5, a step part 8 is arranged on the middle spacer sleeve 3 at the periphery of the openings on the outer ends of the spaces, a complete ring of the step part 8 is arranged along the openings at the outer ends of the spaces, and the arc cover plate 7 is covered on the step part 8. One effect of the step part 8 is to serve as a positioning structure to facilitate the positioning and assembly of the arc cover plate 7. In the present embodiment, the mandrel, the outer sleeve, the middle spacer sleeve and the arc cover plate can be made of metal materials.

Figure 3:
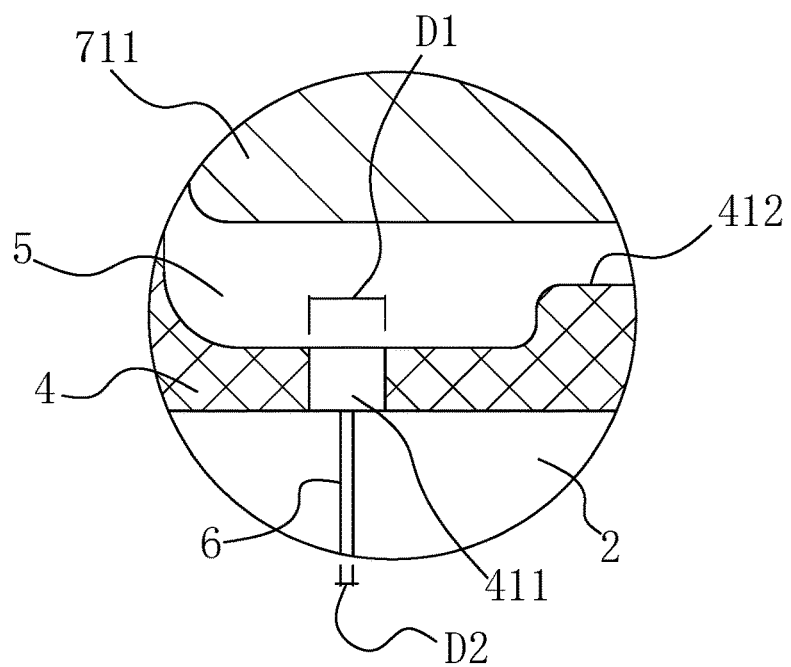
FIG. 3 is an amplified structural schematic diagram of B part in FIG. 2.

As shown in FIG. 3, a rubber coating at the outer circumferential surface of the mandrel in the liquid cavities is also provided with a first rubber coating through hole 411 and a second rubber coating through hole. One end of the damping through holes 6 is communicated with one liquid cavity 5 through the first rubber coating through hole 411, and the other end of the damping through holes 6 is communicated with another liquid cavity 5 through the second rubber coating through hole, thereby communicating the two liquid cavities 5 through the damping through holes 6. To ensure that the damping through holes are communicated with the rubber coating through holes, the projections of the damping through holes on the axial projection surface along the mandrel and the projections of the rubber coating through holes on the axial projection surface along the mandrel need to be completely coincident or partially coincident. The diameter of the rubber coating through holes is set as D1 and the diameter of the damping through holes is set as D2. Then, in the present embodiment, D1>D2. In this design, firstly, the difficulty of assembly can be reduced and assembly is facilitated. In addition, a damping force can be generated when the liquid flows through the damping through holes. The size of the damping force can be adjusted by adjusting the size of D2.

As shown in FIG. 5, in order to further ensure the sealing performance of the openings at the outer ends of the spaces, it is also necessary to match rubber coating with pressing mounting. Namely, in the present embodiment, the step part 8 is a one-level step, and the rubber is coated onto the step part 8. Rubber coating thickness here can be set according to actual conditions. During assembly, the mandrel 2 and the hollowed middle spacer sleeve 3 are vulcanized into a whole through the rubber 4, the rubber is coated on the step part 8 and then the arc cover plate 7 is covered on the step part 8, so that the arc cover plate 7 is in contact with the rubber coating on the step part 8. Then, the middle spacer sleeve 3 with the arc cover plate 7 is in interference assembly into the outer sleeve 1, the arc cover plate 7 is pressed on the step part 8 by the acting force generated after the assembly, so that the rubber coating on the step part 8 is deformed to achieve a sealing effect. After the outer sleeve 1 is assembled, a certain reduction amount can be further designed to further improve the sealing effect.

Figure 4:
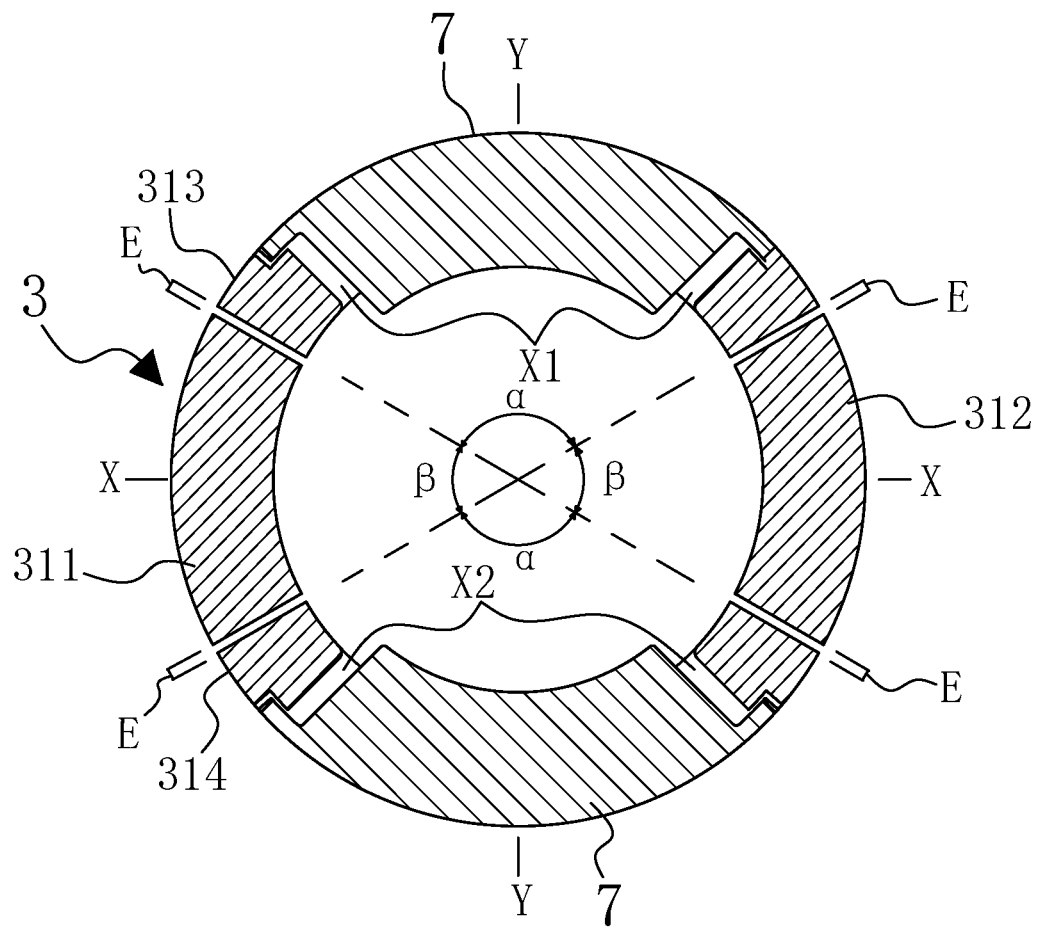
FIG. 4 is a sectional structural schematic diagram of a middle spacer sleeve along a radial direction of a mandrel in embodiment 1 of the present invention.
Figure 6:
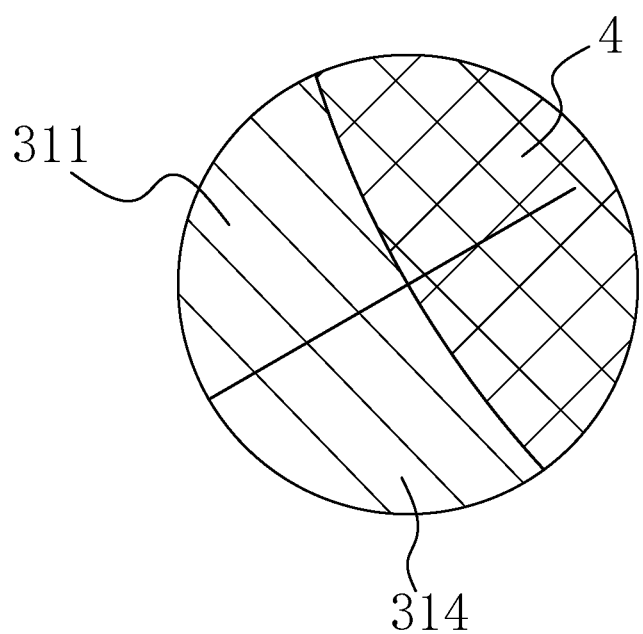
FIG. 6 is an amplified structural schematic diagram of G part in FIG. 1.
Figure 7:
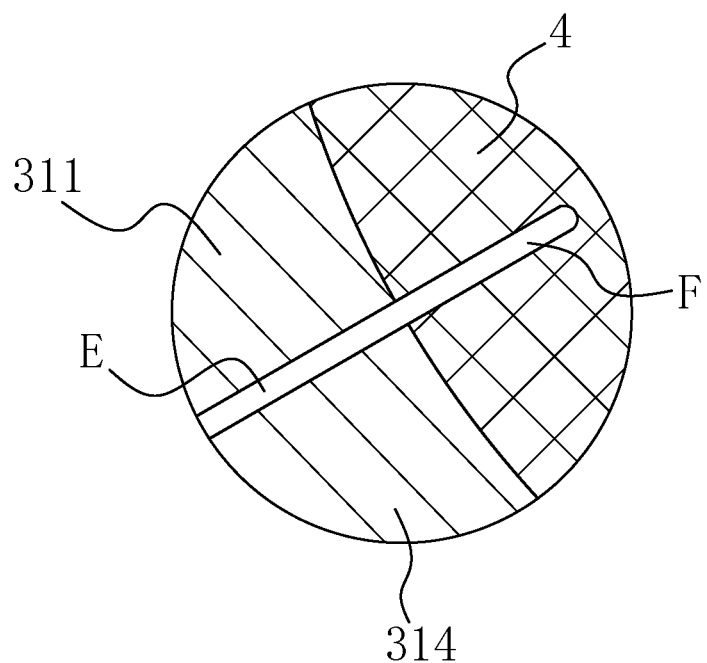
FIG. 7 is an amplified structural schematic diagram of G part in FIG. 1 when a middle spacer sleeve is not assembled in an outer sleeve.

The middle spacer sleeve adopts an integral spacer sleeve or a multi-disc spacer sleeve. In the present embodiment, the multi-disc spacer sleeve is adopted, such as two-disc structure and three-disc structure. Specifically, in the present embodiment, a four-disc structure is adopted. As shown in FIG. 4, the middle spacer sleeve 3 in the present embodiment is a four-disc spacer sleeve comprising a left arc disc body 311, a right arc disc body 312, an upper arc disc body 313 and a lower arc disc body 314. Four disc bodies are circumferentially enclosed to form a spacer sleeve. As shown in FIG. 7, after the middle spacer sleeve is bonded with the mandrel through rubber vulcanization, before interference assembly, a gap E (such as the gap E between one end of the left arc disc body 311 and one end of the lower arc disc body 314 in FIG. 7) is reserved between the end surfaces of two close ends of adjacent disc bodies. An open gap F is also reserved in the rubber 4 and at each gap E. However, after the interference assembly of the nodes, as shown in FIG. 6, under the influence of the acting force, the gap E and the adjacent open gap F disappear, i.e., the end surfaces of two close ends of adjacent disc bodies come into contact with each other and the open gap F is also filled with the deformed rubber 4, so that the performance of the assembled product can be further enhanced. As shown in FIG. 7, in the present embodiment, the open gap F is a U-shaped groove. The opening of the U-shaped groove faces the gap E and the radial extension lines of the middle spacer sleeve on the edges of both sides of the U-shaped groove respectively coincide with the end surfaces of two close ends of two disc bodies at the gap E. The depth of the U-shaped groove is designed according to the actual assembling conditions. The open gap F is set to ensure that the end surfaces of two close ends of each disc body come into contact with each other after the assembly, and the rubber may not enter therebetween.

In the design of the multi-disc middle spacer sleeve, equal design or non-equal design can be adopted. In the present embodiment, the non-equal design is adopted, i.e., by taking a center point of the middle spacer sleeve as a circle point, circle center angles corresponding to the plurality of arc disc bodies are unequal. As shown in FIG. 4, the circle center angles corresponding to the radian of the upper arc disc body 313 and the lower arc disc body 314 are set as α, and the circle center angles corresponding to the left arc disc body 311 and the right arc disc body 312 are set as β, and α>β. This is because in the present embodiment, the hollowed arc disc bodies are the radian of the upper arc disc body 313 and the lower arc disc body 314. After hollowing, by taking the radian of the upper arc disc body 313 and the direction of the lower arc disc body 314 (Y direction in the figure) as a void direction and taking the direction of the left arc disc body 311 and the right arc disc body 312 (X direction in the figure) as a solid direction, the radian of the arc disc body in the void direction is maximized to maximize the volume of the liquid cavities, thereby benefiting the improvement of product performance. In addition, the radial stiffness in the void direction can be reduced. In the present embodiment, α is 120 degrees and β is 60 degrees.

The hollowed disc bodies may be any disc body in the multi-disc middle spacer sleeve. In the present embodiment, the radian of the upper arc disc body 313 and the lower arc disc body 314, which are symmetrically arranged about the axial direction of the mandrel 2, are hollowed to form the liquid cavities.

Figure 8:
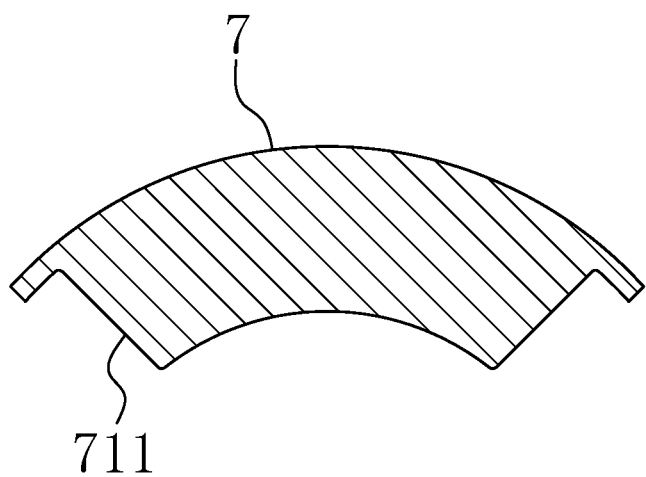
FIG. 8 is a sectional structural schematic diagram of an arc cover plate in FIG. 4.

In order to provide nonlinear stiffness properties by liquid rubber, a design solution of a matching structure between the metal cover and the mandrel is adopted. The present invention is described below in embodiment 1, embodiment 2 and embodiment 3. In the present embodiment 1, as shown in FIG. 2, FIG. 3 and FIG. 8, the inner circumferential arc surface of the arc cover plate 7 is provided with a bump 711 that protrudes towards the mandrel 2. During work, when the node is loaded, the bump 711 comes into contact with the rubber 4 covered on the outer circumferential surface of the mandrel 2 to provide nonlinear stiffness properties, and under the further effect of the load, the bump 711 comes into indirect contact with the mandrel 2 to form the protection function of hard stop limiting. In the present embodiment, the rubber in contact with the bump 711 is specifically configured as an externally convex rubber block 412. The shape and the size of the rubber block 412 are matched with the shape and the size of the bump 711. The protrusion direction of the rubber block 412 is in a mutually protruding state with the protrusion direction of the bump 711, and the contact surfaces of the rubber block 412 and the bump 711 are configured as arc surfaces. Because the rubber block 412 and the bump 711 are mutually matched, the contact surface of the bump 711 is an inwards concave arc surface and the contact surface of the rubber block 412 is an outwards convex arc surface (as shown in FIG. 1). Under the effect of the load, the gap H between the bump 711 and the rubber block 412 gradually disappears. After the gap H disappears, the bump 711 and the rubber block 412 come into contact with each other, and the node begins to provide nonlinear stiffness properties. At this moment, through the contact between the bump 711 and the rubber block 412, a buffer effect can also be provided through the rubber block 412 to avoid hard contact. Therefore, a nonlinear stiffness curve can be adjusted by adjusting the size of the gap H. In the present embodiment, bumps 711 are arranged on the inner circumferential arc surfaces of two arc cover plates 7. The corresponding convex rubber blocks 412 are arranged on the outer circumferential surface of the mandrel 2 corresponding to the two bumps 711. One bump 711 and one corresponding rubber block 412 as well as the other bump 711 and the other corresponding rubber block 412 are respectively located in two liquid cavities 5.

It should be noted here that through the above design of the arc cover plates 7, the bumps 711 and the rubber blocks 412, the volume size of the liquid cavities is also influenced. The volume of the bumps 711 and the rubber blocks 412 can be designed to be smaller, so that the volume of the liquid cavities is larger and more liquid can be accommodated. The liquid cavities in the present embodiment are small-volume liquid cavities, and the nodes of the small-volume liquid cavities can provide larger dynamic stiffness properties under the same stiffness.

As shown in FIG. 2, the mandrel 2 is formed as follows: a mandrel is formed by taking a central axis I of the mandrel 2 as a bus and taking a saddle surface J, which is high at both ends and low in the middle, as a rotating surface. Through this arrangement of the mandrel, the rubber 4 between the mandrel and the middle spacer sleeve is divided into two parts. One part of the rubber is middle rubber 413, and the other part of the rubber is end rubber 414 located at both ends of the middle rubber 413. The thickness of the middle rubber 413 along the radial direction of the mandrel is set as radial thickness K1, and the thickness of the end rubber 414 along the axial direction of the mandrel is set as axial thickness K2. During work, the middle rubber 413 mainly provides the radial stiffness, and the end rubber 414 mainly provides the axial stiffness. In this way, the radial thickness K1 and the axial thickness K2 are adjusted to adjust the radial stiffness and the axial stiffness of the nodes.

A liquid injection hole 9 is also arranged on the mandrel 2. The liquid injection hole 9 is communicated with one liquid cavity 5. At the beginning, the liquid is injected into the liquid cavity 5 through the liquid injection hole 9, and then sealed.

Figure 9:
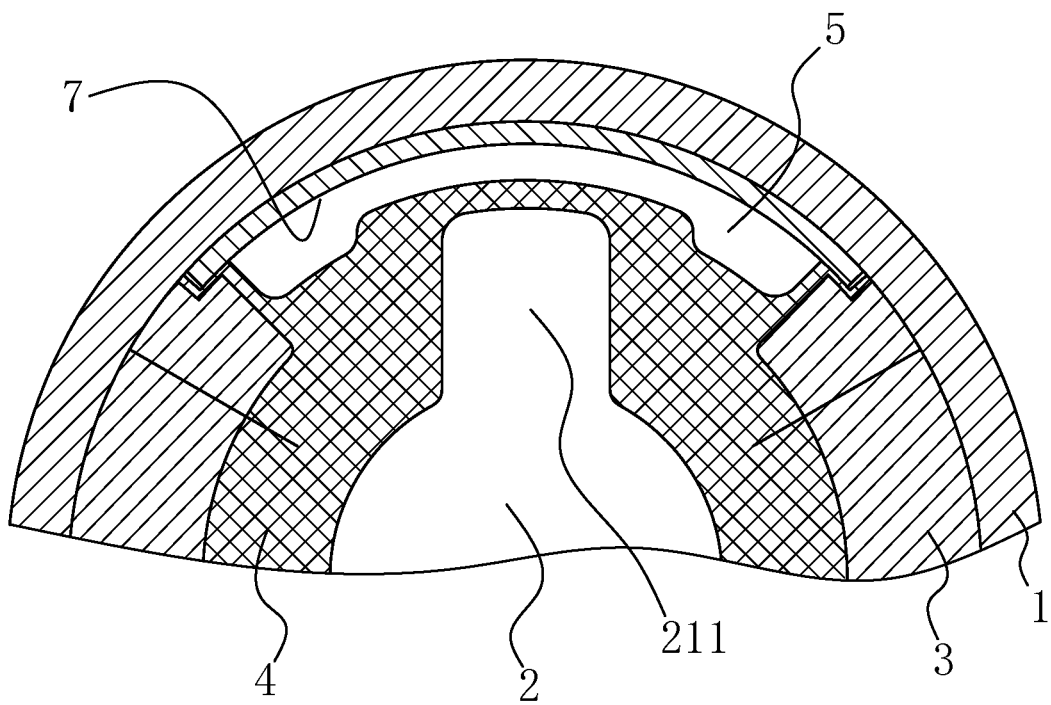
FIG. 9 is a local sectional structural schematic diagram of nodes sectioned along a radial direction of a mandrel and located at an upper liquid cavity in embodiment 2 of the present invention.

Embodiment 2: as shown in FIG. 9, compared with embodiment 1, the differences are that: in order to provide nonlinear stiffness properties by the liquid rubber, the present embodiment adopts the following solution. No bump is arranged on the inner circumferential arc surface of the arc cover plate 7 in the present embodiment, and a mandrel bump 211 is arranged on the mandrel 2, and the rubber 4 is covered on the mandrel 2 and the mandrel bump 211 to form along them. Under the effect of the load, the arc cover plate 7 firstly comes into contact with the rubber 4 located in the liquid cavities and the nodes start to provide nonlinear stiffness characteristics. Under the further effect of the load, the arc cover plate 7 comes into indirect contact with the mandrel bump 211 to form the protection function of hard stop limiting. In the present embodiment, corresponding convex mandrel bumps 211 are arranged at the outer circumferential surfaces of the mandrel 2 corresponding to the two arc cover plates 7. The two mandrel bumps 211 are respectively located in two liquid cavities 5.

Figure 10:
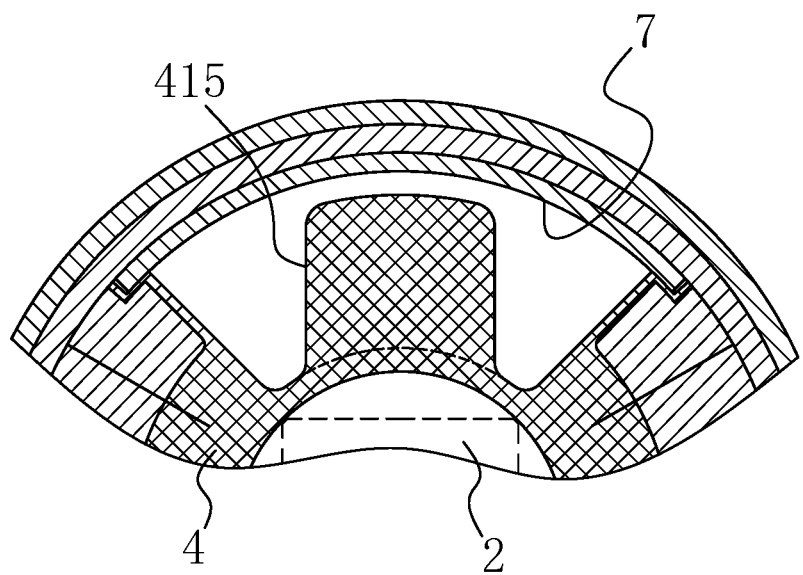
FIG. 10 is a local sectional structural schematic diagram of nodes sectioned along an axial direction of a mandrel and located at an upper liquid cavity in embodiment 3 of the present invention.

Embodiment 3: as shown in FIG. 10, compared with embodiment 1, the differences are that: in order to provide nonlinear stiffness properties by the liquid rubber, the present embodiment adopts the following solution. No bump is arranged on the arc cover plate 7 and the mandrel 2 in the present embodiment, and rubber bumps 415 that protrude towards the arc cover plate 7 are only arranged on the rubber 4 located on the outer circumferential surface of the mandrel 2 covered in the liquid cavity. When the arc cover plate 7 comes into contact with the rubber bumps 415, the nodes start to provide nonlinear stiffness characteristics, but in the present embodiment, the nodes have no protection function of hard stop limiting. In the present embodiment, the two rubber bumps 415 are respectively located in two liquid cavities 5.

Figure 11:
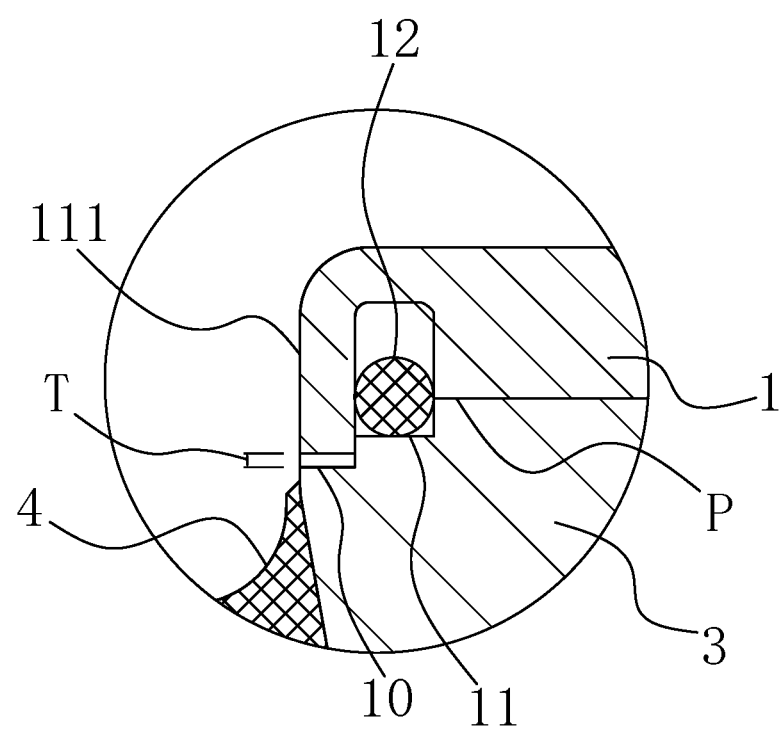
FIG. 11 is a local sectional structural schematic diagram of nodes sectioned along an axial direction of a mandrel and located at an end part of one end of an outer sleeve in embodiment 4 of the present invention.

Embodiment 4: as shown in FIG. 11, compared with embodiment 1, the difference of the present embodiment is that: both ends of the outer sleeve 1 in the present embodiment adopt flanging buckling design structures. A continuous first step part 10 and a second step part 11 are arranged on one end of the middle spacer sleeve 3. The first step part 10 is positioned in a lower position (near the mandrel), and the second step part 11 is positioned in an upper position (far away from the mandrel). The end surface of one end of the outer sleeve 1 is vertically flush with the side vertical surface of the second step part 11. An end sealing ring 12 is arranged on the second step part 11. When the flanging buckling is not performed, the height of the end sealing ring 12 is larger than the height of the second step part 11, i.e., the end sealing ring 12 is positioned between the second step part 11 and the outer sleeve 1. An outer sleeve flanging part 111 is extended on the end surface of one end of the outer sleeve 1. During flanging operation, the end sealing ring 12 is pressed by flanging and bending the outer sleeve flanging part 111, and the end sealing ring 12 is used to seal an end gap P of the contact surface between the outer sleeve 1 and the middle spacer sleeve 3 to further enhance the sealing performance of the node. The outer sleeve flanging part 111 is flanged to the side vertical surface of the first step part 10, so as to flange and position the flanging operation by the first step part 10. After the flanging operation, a gap T is reserved between the end part of the outer sleeve flanging part 111 and a horizontal bottom surface of the first step part 10.

The other end of the middle spacer sleeve 3 is also provided with a continuous first step part and a second step part, and the end surface of the other end of the overall outer sleeve is also extended with the outer sleeve flanging part. The flanging buckling design structure at the other end of the middle spacer sleeve is the same as the flanging buckling design structure at one end of the above middle spacer sleeve, and will not be repeated here.

Figure 12:
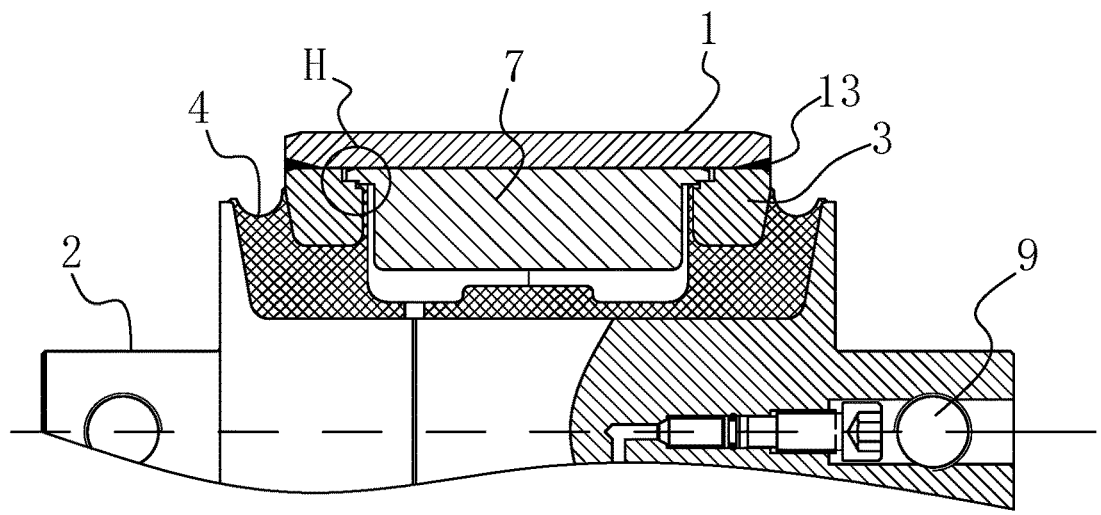
FIG. 12 is a local sectional structural schematic diagram of nodes sectioned along an axial direction of a mandrel in embodiment 5 of the present invention.
Figure 13:
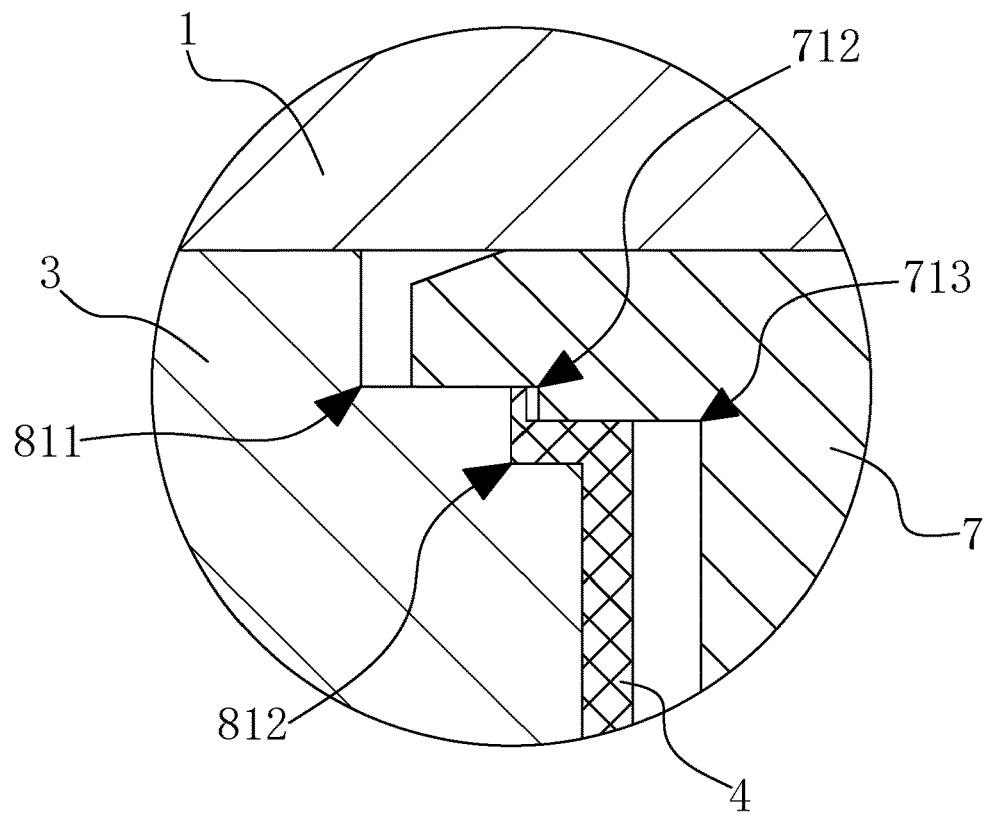
FIG. 13 is an amplified structural schematic diagram of H part in FIG. 12.

Embodiment 5: as shown in FIG. 12 and FIG. 13, compared with embodiment 1, the differences are that: the step part 8 arranged on the middle spacer sleeve 3 is a two-level step and has a first spacer sleeve step part 811 and a second spacer sleeve step part 812. The first spacer sleeve step part 811 is located near one side of the outer sleeve 1, i.e., the outer side, and the second spacer sleeve step part 812 is located near one side of the mandrel, i.e., the inner side. The rubber is coated to the second spacer sleeve step part 812, and the arc cover plate 7 at the contact point with the step part is correspondingly arranged into the shape of multi-level steps, including a first cover plate step part 712 and a second cover plate step part 713. During assembly, when the arc cover plate 7 is covered on the step part 8, the first cover plate step part 712 is connected with the first spacer sleeve step part 811 in a metal interference fit mode, and the second cover plate step part 713 is connected with the second spacer sleeve step part 812 in a rubber-metal over-pressure fit mode, i.e., the rubber 4 is pressed on the second spacer sleeve step part 812 by the second cover plate step part 713. This arrangement avoids the problem of internal liquid leakage caused by the failure of over-pressure fit between the metal and the rubber due to the relaxation of the rubber after long-term use.

After the integral middle spacer sleeve and the mandrel are assembled into the outer sleeve 1, the end part of contact between the outer sleeve 1 and the middle spacer sleeve 3 is chamfered, and then applied with solid gum 13 to further increase the sealing effect.

Figure 14:
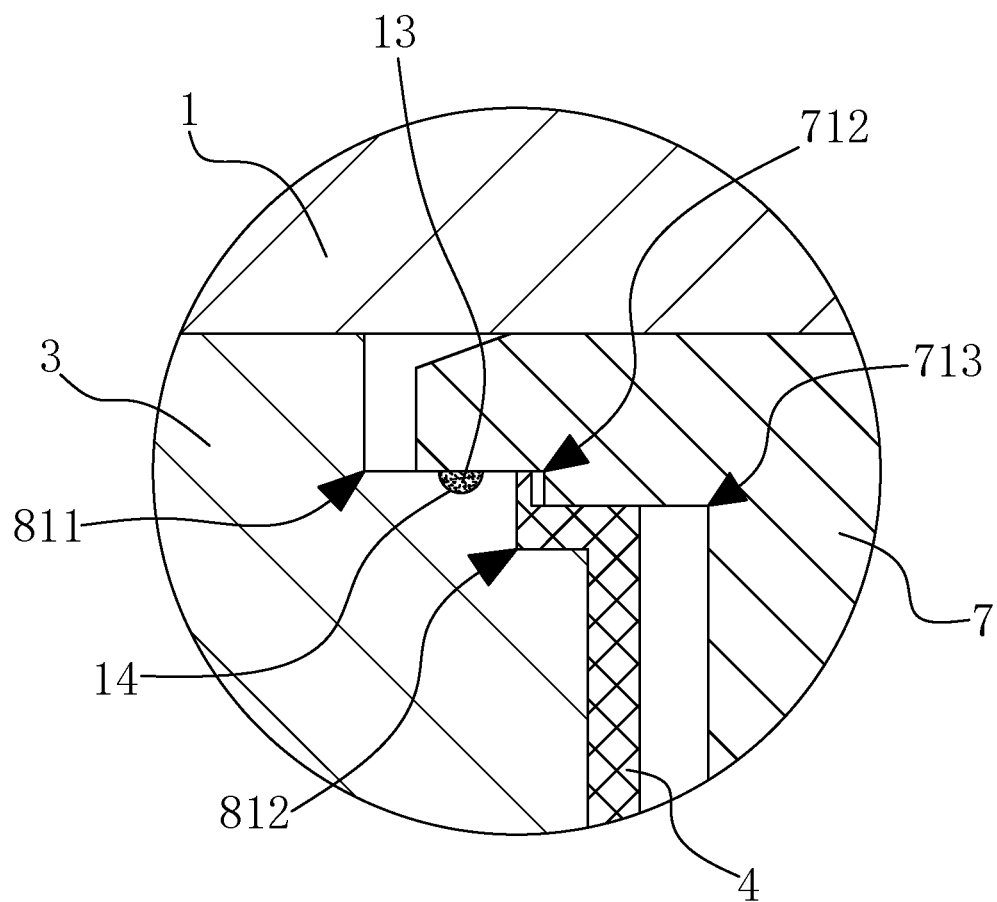
FIG. 14 is a local sectional structural schematic diagram of nodes sectioned along an axial direction of a mandrel and located at a step part of a middle spacer sleeve in embodiment 6 of the present invention.

Embodiment 6: as shown in FIG. 14, compared with embodiment 5, the differences are that: a rubber groove 14 is arranged on the first spacer sleeve step part 811. Before assembly, the solid gum is applied in the rubber groove 14. During assembly, when the first cover plate step part 712 and the first spacer sleeve step part 811 are connected by the metal interference fit mode, the solid gum is also in contact with the first cover plate step part 712 to further increase the sealing effect.

Figure 15:
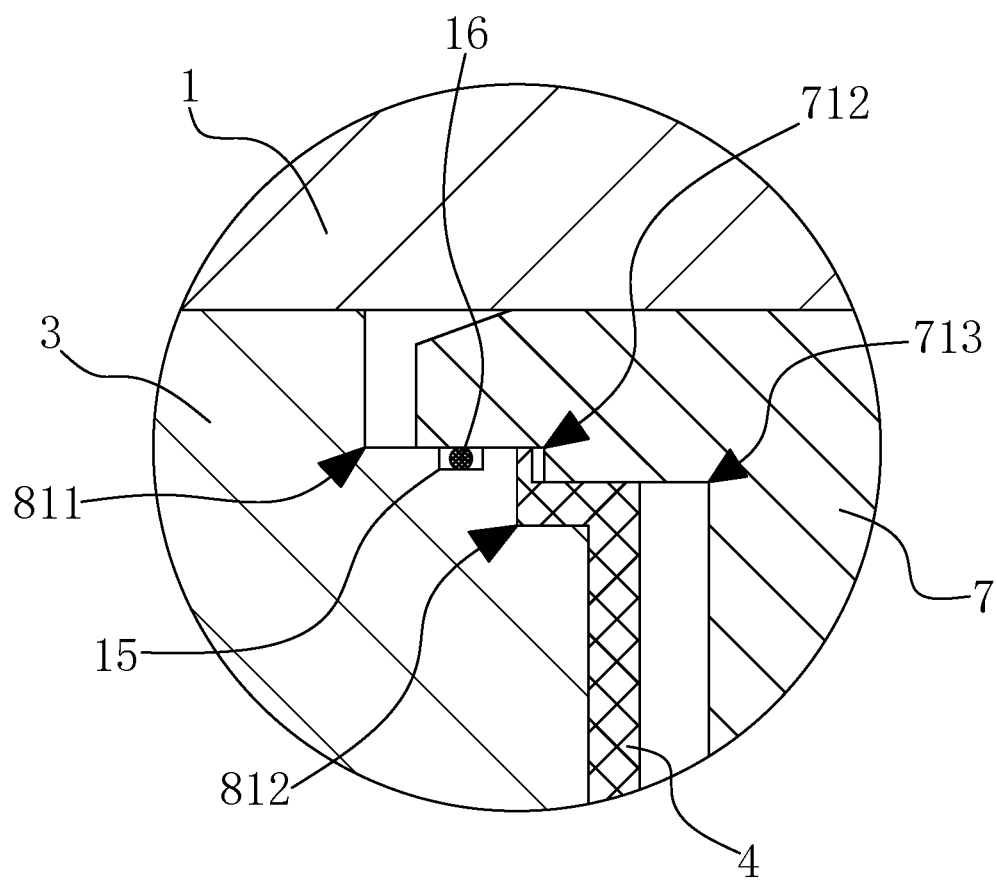
FIG. 15 is a local sectional structural schematic diagram of nodes sectioned along an axial direction of a mandrel and located at a step part of a middle spacer sleeve in embodiment 7 of the present invention.

Embodiment 7: as shown in FIG. 15, compared with embodiment 5, the differences are that: a sealing groove 15 is formed on the first spacer sleeve step part 811. Before assembly, a sealing ring 16 is assembled in the sealing groove 15. During assembly, when the first cover plate step part 712 and the first spacer sleeve step part 811 are connected in the metal interference fit mode, the sealing ring 16 is also pressed in the sealing groove 15 by the first cover plate step part 712 to further increase the sealing effect.

Figure 16:
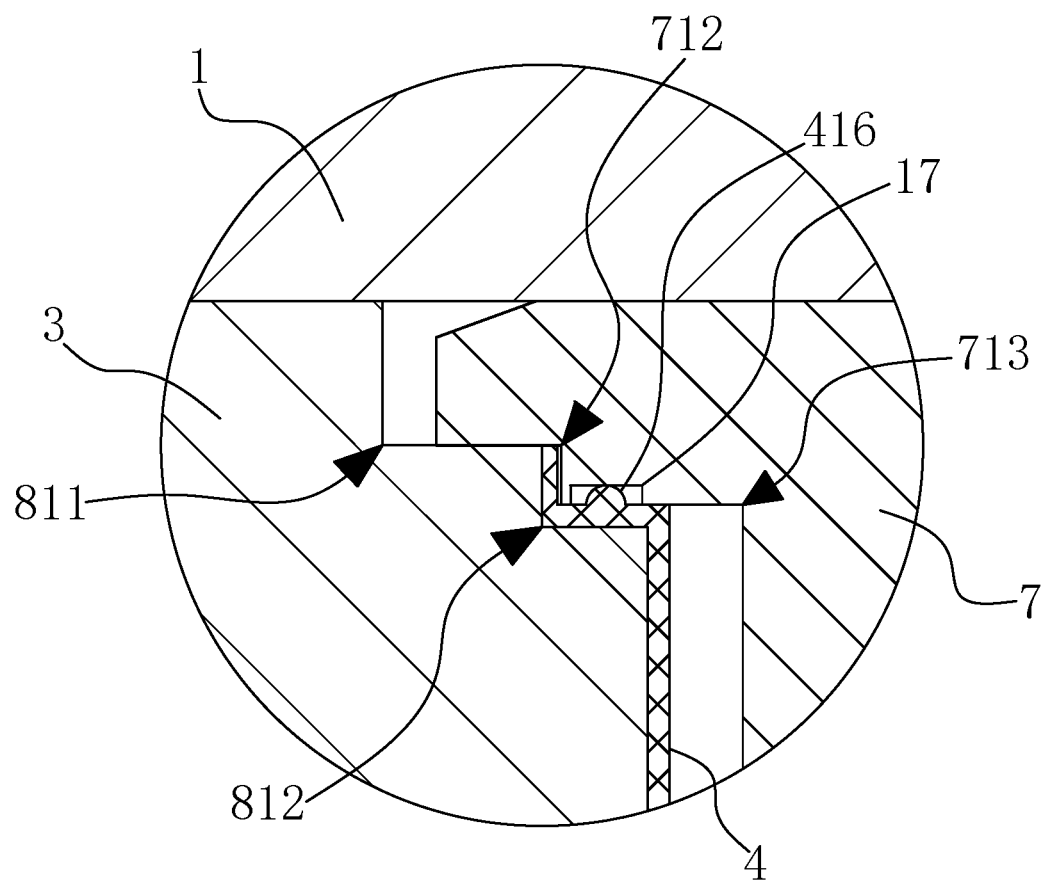
FIG. 16 is a local sectional structural schematic diagram of nodes sectioned along an axial direction of a mandrel and located at a step part of a middle spacer sleeve in embodiment 8 of the present invention.

Embodiment 8: as shown in FIG. 16, compared with embodiment 5, the differences are that: a cover plate sealing groove 17 is formed on the second cover plate step part 713. When the rubber is coated on the second spacer sleeve step part 812, a sealing bulge 416 is formed on the rubber 4. During assembly, when the second cover plate step part 713 presses the rubber 4 onto the second spacer sleeve step part 812, the sealing bulge 416 is positioned in the cover plate sealing groove 17 and is extruded and contacted by the cover plate sealing groove 17.

Figure 17:
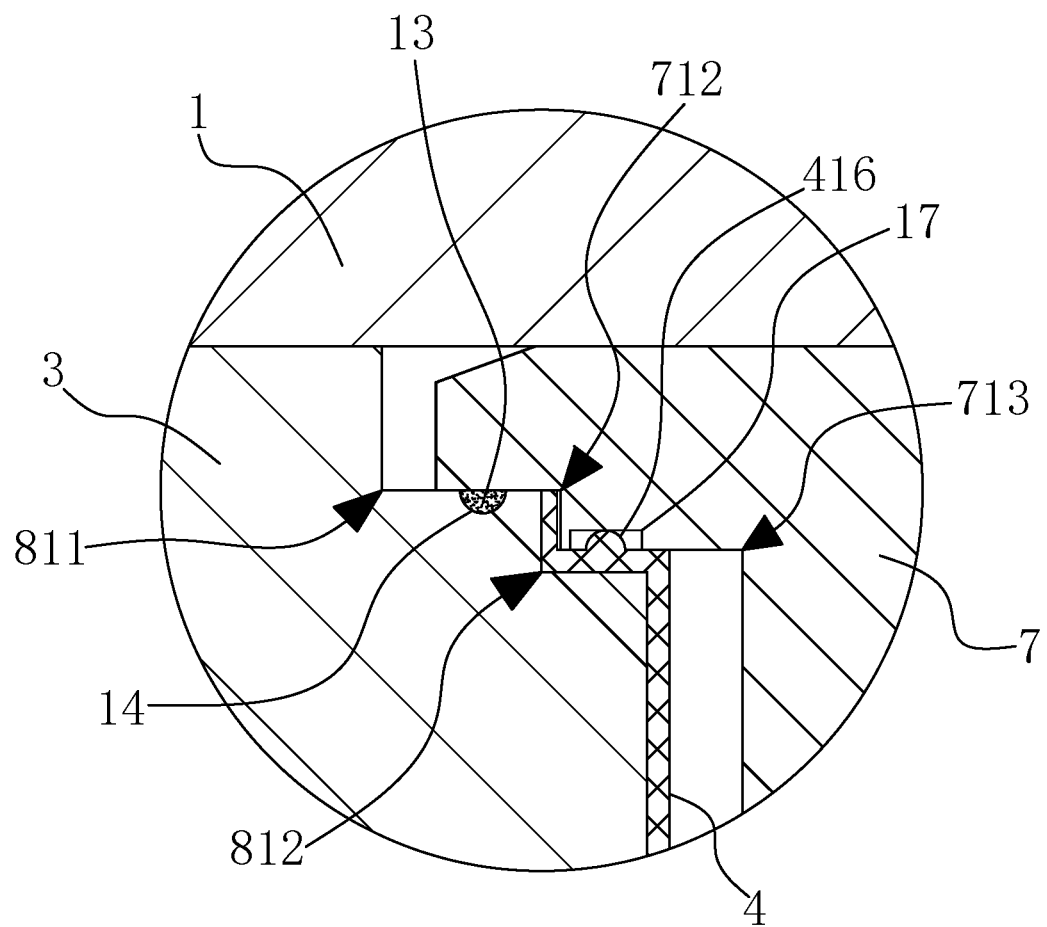
FIG. 17 is a local sectional structural schematic diagram of nodes sectioned along an axial direction of a mandrel and located at a step part of a middle spacer sleeve in embodiment 9 of the present invention.

Embodiment 9: as shown in FIG. 17, compared with embodiment 5, the differences are that: in the present embodiment, the sealing forms in embodiment 8 and embodiment 6 can also be combined to further enhance the sealing effect, i.e., a cover plate sealing groove 17 is formed on the second cover plate step part 713. When the rubber is coated on the second spacer sleeve step part 812, a sealing bulge 416 is formed on the rubber 4. During assembly, when the second cover plate step part 713 presses the rubber 4 onto the second spacer sleeve step part 812, the sealing bulge 416 is positioned in the cover plate sealing groove 17 and is extruded and contacted by the cover plate sealing groove 17. A rubber groove 14 is arranged on the first spacer sleeve step part 811. Before assembly, the solid gum is applied in the rubber groove 14. During assembly, when the first cover plate step part 712 and the first spacer sleeve step part 811 are connected by the metal interference fit mode, the solid gum is also in contact with the first cover plate step part 712 to further increase the sealing effect.

Figure 18:
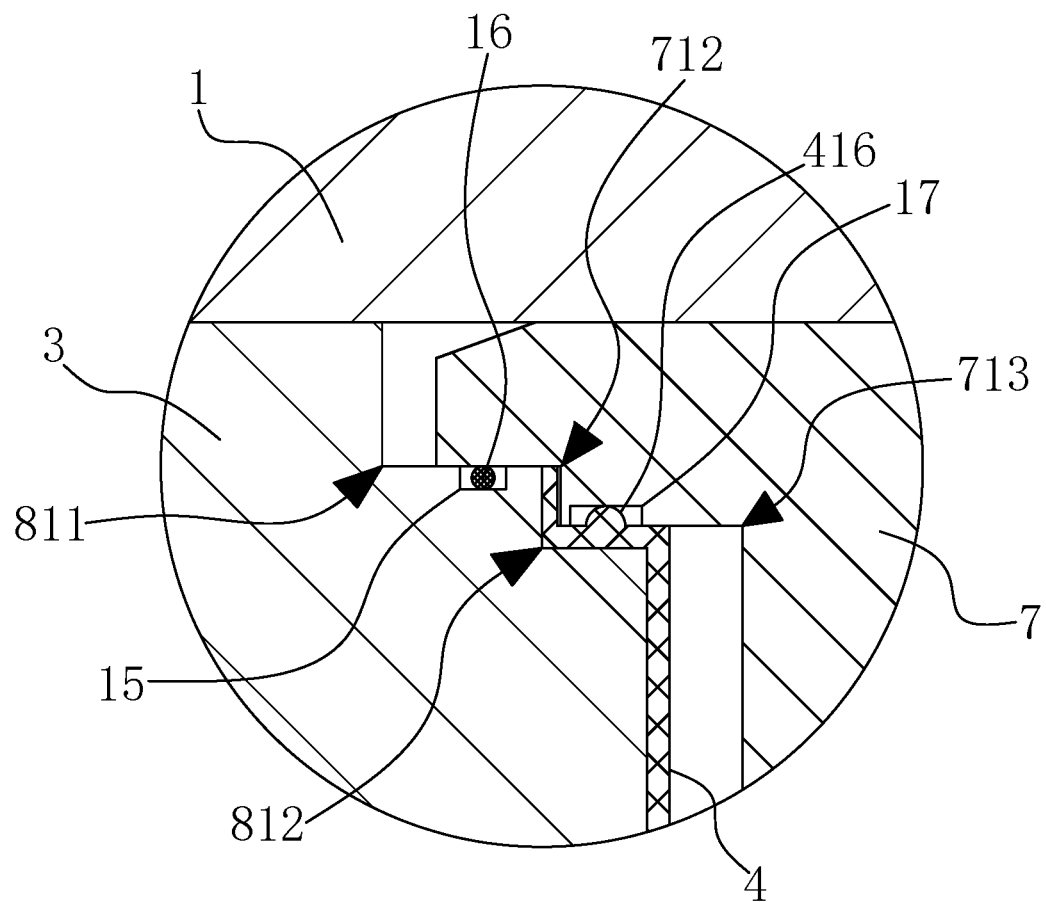
FIG. 18 is a local sectional structural schematic diagram of nodes sectioned along an axial direction of a mandrel and located at a step part of a middle spacer sleeve in embodiment 10 of the present invention.

Embodiment 10: as shown in FIG. 18, compared with embodiment 8, the differences are that: in the present embodiment, the sealing forms in embodiment 8 and embodiment 7 can also be combined to further enhance the sealing effect, i.e., a cover plate sealing groove 17 is formed on the second cover plate step part 713. When the rubber is coated on the second spacer sleeve step part 812, a sealing bulge 416 is formed on the rubber 4. During assembly, when the second cover plate step part 713 presses the rubber 4 onto the second spacer sleeve step part 812, the sealing bulge 416 is positioned in the cover plate sealing groove 17 and is extruded and contacted by the cover plate sealing groove 17. A sealing groove 15 is formed on the first spacer sleeve step part 811. Before assembly, a sealing ring 16 is assembled in the sealing groove 15. During assembly, when the first cover plate step part 712 and the first spacer sleeve step part 811 are connected in the metal interference fit mode, the sealing ring 16 is also pressed in the sealing groove 15 by the first cover plate step part 712 to further increase the sealing effect.

In conclusion, the present invention forms a plurality of independent liquid cavities capable of storing liquid by hollowing and vulcanizing the rubber on the middle spacer sleeve, then installs the damping through holes which penetrate through the mandrel on the mandrel, and communicates the plurality of liquid cavities by the damping through holes to form liquid rubber composite nodes, so as to provide small radial stiffness and large axial stiffness to realize a large dynamic-static ratio, thereby optimizing the product performance of the liquid rubber composite nodes. Through the design of the specific formation method of the liquid cavities, the liquid cavities can be formed smoothly and the quality of the product is guaranteed. When the middle spacer sleeve is designed into a multi-disc spacer sleeve, the assembly structure and the process thereof are designed so as to ensure that after the interference assembly is completed, direct contact is made between the end surfaces of the two adjacent ends of the adjacent disc bodies without rubber interference, which can further improve the performance of the assembled product. When the middle spacer sleeve is designed into a multi-disc spacer sleeve, the non-equal design is adopted for the middle spacer sleeve, and the volume space of the liquid cavities is enlarged as much as possible. The rubber in the middle of the middle spacer sleeve is divided into the middle rubber and the end rubber, and the radial thickness of the middle rubber and the axial thickness of the end rubber are adjusted to adjust the radial stiffness and the axial stiffness of the nodes. The sealing effect is further improved by the sealing structure design between the arc cover plate and the middle spacer sleeve.

"A plurality of" in the present embodiment means a quantity of "two or more than two". The above embodiments are merely used for illustration of the present invention, and not intended to limit the present invention. Various changes or transformations can also be made by those skilled in the art without departing from the spirit and the scope of the present invention. Therefore, all equivalent technical solutions shall also belong to the protection scope of the present invention, and the protection scope of the present invention shall be defined by the claims.

What is claimed is:

1. A formation method for liquid rubber composite nodes with middle damping holes, the formation method comprising:
   adding a middle spacer sleeve between an outer sleeve and a mandrel, bonding the middle spacer sleeve and the mandrel together through rubber vulcanization, and assembling the integrated middle spacer sleeve and the mandrel into the outer sleeve;
   forming damping through holes which penetrate through the mandrel on the mandrel;
   hollowing the middle spacer sleeve to form a plurality of spaces;
   after vulcanization, forming a plurality of interdependent liquid cavities by using rubber and the plurality of spaces; and
   arranging liquid in the plurality of liquid cavities and communicating the plurality of liquid cavities through the damping through holes,
   wherein the mandrel is formed by taking a central axis of the mandrel as a bus and taking a saddle surface, which is high at both ends and low in a middle, as a rotating surface.

2. The formation method for liquid rubber composite nodes with middle damping holes according to claim 1, wherein the liquid cavities is formed as follows: firstly, the plurality of spaces are dug out on the middle spacer sleeve; the spaces are through holes, and outer ends and inner ends of the spaces are open; openings at the inner ends of the spaces are sealed, the openings at the inner ends of the spaces are blocked by the vulcanized rubber after the mandrel and the middle spacer sleeve are bonded together through rubber vulcanization; openings at the outer ends of the spaces are sealed, an arc cover plate is covered on the hollowed middle spacer sleeve and configured for blocking the openings at the outer ends of the spaces; and the plurality of spaces form the plurality of liquid cavities, wherein the arc cover plate comprises a plurality of arc cover plates.

3. The formation method for liquid rubber composite nodes with middle damping holes according to claim 2, wherein a rubber coating at an outer circumferential surface of the mandrel in the liquid cavities is also provided with a first rubber coating through hole and a second rubber coating through hole; one end of the damping through holes is communicated with one liquid cavity through the first rubber coating through hole, and another end of the damping through holes is communicated with another liquid cavity through the second rubber coating through hole, such that the plurality of liquid cavities are in communication through the damping through holes.

4. The formation method for liquid rubber composite nodes with middle damping holes according to claim 2, wherein a bump protruding towards the mandrel is arranged on an inner circumferential arc surface of the arc cover plate; the bump comes into contact with a rubber covered on an outer circumferential surface of the mandrel to provide nonlinear stiffness, and the bump comes into indirect contact with the mandrel to form hard stop limiting, or
   mandrel bumps are arranged on the mandrel, and the rubber is covered on the mandrel and the mandrel bumps; the arc cover plate comes into contact with the rubber located in the liquid cavities and covered on the mandrel and the mandrel bumps to provide nonlinear stiffness, and the arc cover plate comes into indirect contact with the mandrel bumps to form hard stop limiting, or
   rubber bumps protruding towards the arc cover plate are arranged on the rubber located in the liquid cavities and covered on the outer circumferential surface of the mandrel, and the arc cover plate comes into contact with the rubber bumps to provide nonlinear stiffness.

5. The formation method for liquid rubber composite nodes with middle damping holes according to claim 1, wherein the middle spacer sleeve adopts an integral spacer sleeve or a multi-disc spacer sleeve; two liquid cavities are arranged;
   and the two liquid cavities are symmetrically distributed on the middle spacer sleeve about an axis of the middle spacer sleeve.

6. The formation method for liquid rubber composite nodes with middle damping holes according to claim 5, wherein when the middle spacer sleeve adopts the multi-disc spacer sleeve, before assembly, a gap is reserved between end surfaces of two close ends of adjacent disc bodies; and after assembly, the gap disappears and the end surfaces of two close ends of adjacent disc bodies come into contact with each other.

7. The formation method for liquid rubber composite nodes with middle damping holes according to claim 6, wherein before assembly, an open gap is also reserved in the rubber and at each gap; and after assembly, the open gap is filled with deformed rubber, such that the open gap disappears.

8. The formation method for liquid rubber composite nodes with middle damping holes according to claim 5, wherein when the middle spacer sleeve adopts the multi-disc spacer sleeve, by taking a center point of the middle spacer sleeve as a circle point, circle center angles corresponding to a plurality of arc disc bodies are unequal; and the circle center angles corresponding to hollowed arc disc bodies are larger than circle center angles corresponding to non-hollowed arc valve bodies.

9. The formation method for liquid rubber composite nodes with middle damping holes according to claim 5, wherein
the rubber between the mandrel and the middle spacer sleeve is divided into two parts; one part of the rubber is middle rubber, and the other part of the rubber is end rubber located at both ends of the middle rubber; a thickness of the middle rubber along a radial direction of the mandrel is set as radial thickness, and a thickness of the end rubber along an axial direction of the mandrel is set as axial thickness;
and the radial thickness and the axial thickness are adjusted to adjust a radial stiffness and an axial stiffness of the nodes.

10. The formation method for liquid rubber composite nodes with middle damping holes according to claim 2, wherein when the openings at the outer ends of the spaces are sealed, a step part is arranged on the middle spacer sleeve, a complete ring of the step part is arranged along the openings at the outer ends of the spaces, and the arc cover plate is covered on the step part.

11. The formation method for liquid rubber composite nodes with middle damping holes according to claim 10, wherein the step part is a one-level step; during assembly, the rubber is coated on the step part and the arc cover plate is covered on the step part, such that the arc cover plate is in contact with the rubber coating on the step part.

12. The formation method for liquid rubber composite nodes with middle damping holes according to claim 10, wherein the step part is a two-level step and is provided with a first spacer sleeve step part and a second spacer sleeve step part; the first spacer sleeve step part is an outer spacer sleeve step part; the second spacer sleeve step part is an inner spacer sleeve step part; the rubber is coated up to the second spacer sleeve step part; the arc cover plate in contact with the step part is correspondingly arranged into a multi-level step shape, the arc cover plate includes a first cover plate step part and a second cover plate step part; during assembly, when the arc cover plate is covered on the step part, the first cover plate step part is connected in interference fit with the first spacer sleeve step part, and the second cover plate step part is connected to the second spacer sleeve step part in a rubber over-pressure fit mode.

13. The formation method for liquid rubber composite nodes with middle damping holes according to claim 12, wherein a rubber groove is arranged on the first spacer sleeve step part; before assembly, solid gum is applied in the rubber groove; and during assembly, when the first cover plate step part and the first spacer sleeve step part are connected in interference fit, the solid gum is in contact with the first cover plate step part.

14. The formation method for liquid rubber composite nodes with middle damping holes according to claim 12, wherein a sealing groove is formed on the first spacer sleeve step part; before assembly, a sealing ring is assembled in the sealing groove; and during assembly, when the first cover plate step part and the first spacer sleeve step part are connected in interference fit, the sealing ring is pressed in the sealing groove by the first cover plate step part.

15. The formation method for liquid rubber composite nodes with middle damping holes according to claim 12, wherein a cover plate sealing groove is formed on the second cover plate step part; when the rubber is coated on the second spacer sleeve step part, a sealing bulge is formed on the rubber; and during assembly, when the second cover plate step part is connected to the second spacer sleeve step part in the rubber over-pressure fit mode, the sealing bulge is positioned in the cover plate sealing groove and is extruded and contacted by the cover plate sealing groove.

16. The formation method for liquid rubber composite nodes with middle damping holes according to claim 15, wherein a rubber groove is arranged on the first spacer sleeve step part; before assembly, solid gum is applied in the rubber groove; and during assembly, when the first cover plate step part and the first spacer sleeve step part are connected in interference fit, the solid gum is in contact with the first cover plate step part.

17. The formation method for liquid rubber composite nodes with middle damping holes according to claim 15, wherein a sealing groove is formed on the first spacer sleeve step part; before assembly, a sealing ring is assembled in the sealing groove; and during assembly, when the first cover plate step part and the first spacer sleeve step part are connected in interference fit, the sealing ring is pressed in the sealing groove by the first cover plate step part.

\* \* \* \* \*